Oct. 9, 1951     W. M. GAMBILL     2,570,338
FISH LURE
Filed May 2, 1950
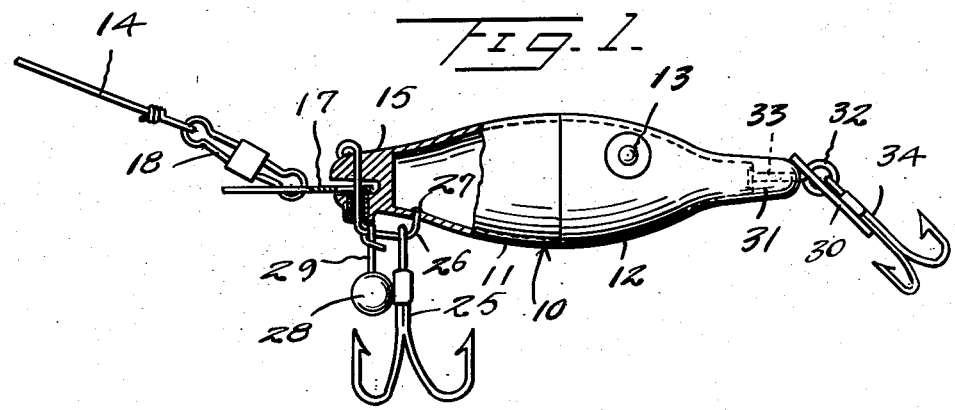
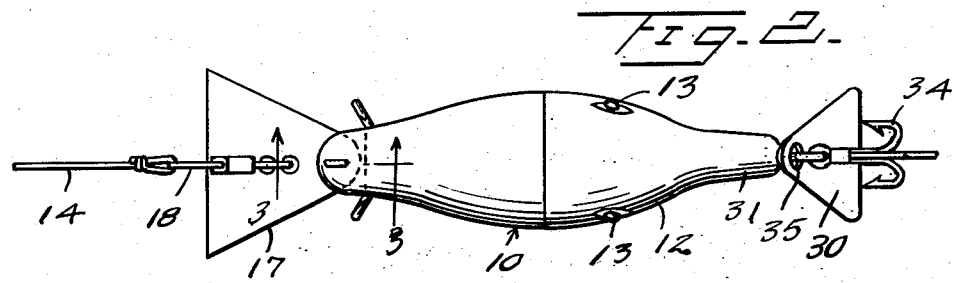
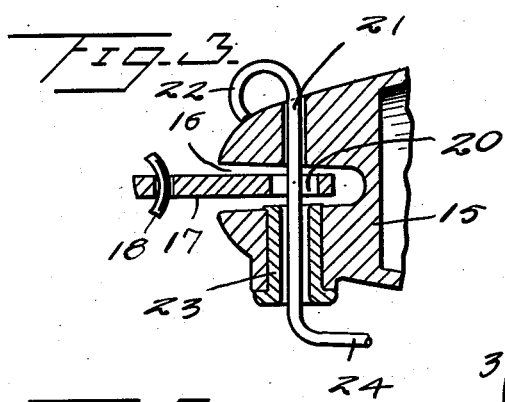
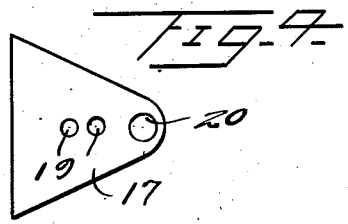
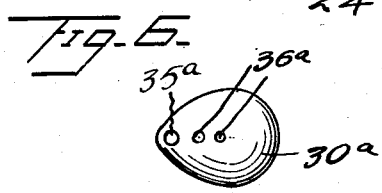
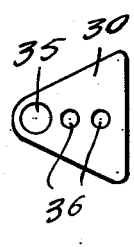
INVENTOR
W. M. Gambill
BY Kimmel & Crowell
ATTORNEYS Patented Oct. 9, 1951

2,570,338

UNITED STATES PATENT OFFICE 2,570,338

FISH LURE

William M. Gambill, Abilene, Tex.

Application May 2, 1950, Serial No. 159,609

2 Claims. (Cl. 43—42.47)

1

This invention relates to fish lures.

An object of this invention is to provide a fish lure which can be used for either surface or deep water fishing.

Another object of this invention is to provide a fish lure which will have both lateral and vertical movement in the water simulating a small fish wiggling through the water.

A further object of this invention is to provide a fish lure formed of a hollow body having loosely connected with the opposite ends thereof a pair of triangular fins with the forward fin having free horizontal swinging movement and limited vertical movement. The rear fin is loosely carried by a rear eye, and a multiple hook secured to the rear eye engages over the top of the rear fin. The rear fin is inclined downwardly and rearwardly and has limited lateral movement. The combination of the two angularly related and loosely mounted fins provides a means whereby the lure will move irregularly from side to side, up and down.

With the above and other objects in view, my invention consists in the arrangement, combination and details of construction disclosed in the drawings and specification, and then more particularly pointed out in the appended claims.

In the drawings:

Figure 1 is a detailed side elevation partly broken away and in section of a fish lure constructed according to an embodiment of this invention.

Figure 2 is a plan view of this device.

Figure 3 is a fragmentary sectional view taken on the line 3—3 of Figure 2.

Figure 4 is a plan view of the front fin.

Figure 5 is a plan view of the rear fin.

Figure 6 is a plan view of a modified form of tail fin.

Referring to the drawing, the numeral 10 designates generally a hollow buoyant body which tapers toward each end and is formed of secured together front and rear hollow sections, 11 and 12, respectively. In the present instance the rear section 12 has a pair of eyes 13 secured thereto and the front section 11 has a leader 14 secured thereto as will be hereinafter described. The forward end or nose 15 of the front section 11 is solid and is provided with a transversely disposed slot 16 within which a triangular fin or blade 17 is loosely mounted. The leader 14 is connected to the fin or blade 17 by means of a connector 18 which engages in a pair of openings 19 formed in the fin or blade 17. The fin or blade 17 is formed with a relatively large opening 20 ad-

2 jacent the apex or rear end thereof, and a pivot pin 21 engages loosely through the opening 20. The pivot pin 21 extends vertically through the head 15, intersecting the slot 16 and terminates at its upper end in an eye 22. The lower or opposite end of the pin 21 extends through a grommet or metal bearing member 23 and is formed at its lower end with a horizontally disposed and rearwardly extending extension 24.

The extension 24 forms a guide for a multiple fish hook 25, and the rear of the guide or extension 24 is formed with an upwardly bent extension 26 which extends upwardly into the forward body section 11 and is secured thereto by upsetting the end of the extension 26 as indicated at 27. In order to provide a means whereby the lure may be directed downwardly for deep water fishing, I have provided a weight 28 which is secured to a shank or wire 29 engaging about the guide 24.

A rear fin 30 of triangular configuration is mounted on the rear or tail portion 31 of the body section 12, being mounted on an eye 32 formed with a shank 33 which is fixed within the tail member 31. A multiple fish hook 34 is secured on the eye 32 engaging on the upper side of the tail fin 30, and the tail fin 30 is formed with a relatively large opening 35 within which a portion of the eye 32 engages and is also formed with a second smaller opening 36 through which another portion of the eye 32 engages.

By extending the eye 32 through the two openings 35 and 36 the forward portion of the tail fin 30 will bear against the rear of the tail member 31 so that the fin 30 will be disposed on an upward and forward inclination, thereby tending to raise the rear of the lure as the lure moves through the water. By mounting the tail fin 30 on the eye 32 loosely, this tail fin may have relative lateral swinging movement in addition to slight turning or twisting movement on the eye 32. The variations in the movement of the fin 30 will cause variations in the movement of the body 10 as the lure is pulled through the water.

This lure is designed to be made out of plastic or other suitable and like material, and, if it is desired, to use the lure for surface fishing, the weight 28 may be removed. With the weight 28 at the forward end of the lure the lure will tend to dive downwardly as it is being pulled through the water.

From the description and accompanying drawings of my invention, it will be noted that I have provided a lure of the kind described which essentially and most importantly differs from all others of its kind in that my lure has several motions. Not only does my lure dart from side to side, but by reason of its construction it also has a vertical and what might be generally referred to as a gyratory motion. The lure has thus a very unusual amount of action to thereby more positively attract a fish. It will be noted that the fin or blade 17 being loosely mounted contributes to the aforementioned action of the lure in its passage through the water giving at least two distinctive darting motions instead of an ordinary undulating vertical action.

Referring to Figure 6 there is disclosed a modified form of tail fin 30a which is of ovoidal configuration and provided with a convex upper side and a concave lower side. The fin 30a is formed with a hole 35a to receive the rear eye 32 and is also formed with one or more openings 36a through which the eye 34 is adapted to be threaded.

What is claimed is:

1. A fish lure comprising a hollow body having reduced opposite ends, one of said ends having a forwardly opening horizontally disposed slot, a forward fin loosely disposed in said slot and projecting substantially horizontally from said one end, a substantially U-shaped hook support at said one end, said U-shaped support having the arms thereof oppositely secured at the top and bottom body respectively, one of said arms of the support forming a pivot pin intersecting said slot and loosely extending through said fin, a hook loosely depending from said support, an eye carried by the opposite or rear end of said body, an obliquely disposed fin loosely carried by said eye, and disposed on an upward and forwardly inclined angle, and a rear hook loosely engaging said eye and overlying the upper side of said latter named fin.

2. A fish lure comprising a hollow body having reduced opposite ends, one of said ends having a forwardly opening horizontally disposed slot, a forward fin loosely disposed in said slot and projecting substantially horizontally from said one end, a substantially U-shaped hook support at said one end, one arm of said support forming a pivot pin intersecting said slot and loosely extending through said fin, a hook loosely depending from said support, a dependent member loosely suspended from said support having a weighted end disposed below the body, an eye carried by the opposite or rear end of said body, an obliquely disposed fin loosely carried by said eye, and disposed on an upward and forwardly inclined angle, and a rear hook loosely engaging said eye and overlying the upper side of said latter named fin, each of said fins being of substantially triangular shape with the apex thereof innermost.

WILLIAM M. GAMBILL.

REFERENCES CITED

The following references are of record in the file of this patent:

UNITED STATES PATENTS

| Number | Name | Date |
| --- | --- | --- |
| 1,333,154 | Buddle | Mar. 9, 1920 |
| 1,345,600 | Keeling | July 6, 1920 |
| 1,997,900 | Edwards | Apr. 16, 1935 |
| 2,159,591 | Leusch | May 23, 1939 |
| 2,183,849 | Swanberg | Dec. 19, 1939 |
| 2,246,413 | Haselwood | June 17, 1941 |
| 2,425,272 | Walker et al. | Aug. 5, 1947 |